(12) United States Patent
Li et al.

(10) Patent No.: US 10,759,449 B2
(45) Date of Patent: Sep. 1, 2020

(54) RECOGNITION PROCESSING DEVICE, VEHICLE CONTROL DEVICE, RECOGNITION CONTROL METHOD, AND STORAGE MEDIUM

(71) Applicant: HONDA MOTOR CO., LTD., Minato-ku, Tokyo (JP)

(72) Inventors: Mingmei Li, Wako (JP); Yuji Yasui, Wako (JP); Tokitomo Ariyoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/437,076

(22) Filed: Jun. 11, 2019

(65) Prior Publication Data

US 2019/0382035 A1    Dec. 19, 2019

(30) Foreign Application Priority Data

Jun. 13, 2018    (JP) .................................. 2018-113053

(51) Int. Cl.
*B60W 50/14* (2020.01)
*G06K 9/00* (2006.01)
*G06T 7/70* (2017.01)
*G06F 40/56* (2020.01)

(52) U.S. Cl.
CPC ............. *B60W 50/14* (2013.01); *G06F 40/56* (2020.01); *G06K 9/00718* (2013.01); *G06K 9/00805* (2013.01); *G06T 7/70* (2017.01); *B60W 2050/146* (2013.01); *G06T 2207/30261* (2013.01)

(58) Field of Classification Search
CPC ... B60W 50/14; B60W 2050/146; G06T 7/70; G06T 2207/30261; G06F 40/56; G06K 9/00718; G06K 9/00805
See application file for complete search history.

(56) References Cited

U.S. PATENT DOCUMENTS

| 4,388,608 | A | * | 6/1983 | Bernard | ................. | G01C 21/14 |
| | | | | | | 340/990 |
| 6,587,574 | B1 | * | 7/2003 | Jeannin | .............. | G06K 9/00335 |
| | | | | | | 382/107 |
| 10,540,378 | B1 | * | 1/2020 | Hsiao | ....................... | G06K 9/18 |

(Continued)

FOREIGN PATENT DOCUMENTS

JP    2000-221991    8/2000

*Primary Examiner* — Ojiako K Nwugo
(74) *Attorney, Agent, or Firm* — Amin, Turocy & Watson, LLP

(57) ABSTRACT

A recognition processing device includes a peripheral situation recognition unit configured to recognize a type of object around a vehicle and a positional relationship with the vehicle, an object recognition unit configured to select a word indicating the type of object recognized by the peripheral situation recognition unit and a word indicating a positional relationship between the vehicle and the object, and a text generation unit configured to generate text for describing a peripheral situation recognized by the peripheral situation recognition unit, wherein the text includes the word indicating the type of object selected by the object recognition unit and the word indicating the positional relationship between the vehicle and the object selected by the object recognition unit.

10 Claims, 14 Drawing Sheets

(56) References Cited

U.S. PATENT DOCUMENTS

| | | | |
|---|---|---|---|
| 2008/0285797 A1* | 11/2008 | Hammadou | G06K 9/00771 |
| | | | 382/103 |
| 2011/0026853 A1* | 2/2011 | Gokturk | G06K 9/00375 |
| | | | 382/305 |
| 2013/0155277 A1* | 6/2013 | Ezequiel | H04N 9/79 |
| | | | 348/231.3 |
| 2014/0002496 A1* | 1/2014 | Lamb | G06F 3/14 |
| | | | 345/633 |
| 2017/0091224 A1* | 3/2017 | Shioya | G06F 16/5866 |
| 2018/0143756 A1* | 5/2018 | Mildrew | G06F 3/011 |
| 2018/0166076 A1* | 6/2018 | Higuchi | G10L 15/26 |

\* cited by examiner

| CLASSIFICATION | OBJECT |
|---|---|
| INFORMATION ABOUT ENVIRONMENT | NIGHT, WINTER, WEEK, RAIN, ... |
| INFORMATION ABOUT ROAD ENVIRONMENT | MEDIAN STRIP, TRAVELING LANE, ... |
| INFORMATION ABOUT TRAFFIC PARTICIPANT | CAR, PEDESTRIAN, BUS, BICYCLE, ... SIGNAL LIGHT, TRAFFIC SIGN, INTERSECTION STOP LINE, CROSSWALK, ... |
| INFORMATION ABOUT POSITION OF TRAFFIC PARTICIPANT | FRONT, REAR, LEFT, RIGHT, ... NEAR, FAR, ... |

| | CAR | PEDESTRIAN | SIGNAL LIGHT | CROSSWALK | TRAFFIC SIGN | ... | TRAVELING LANE | OPPOSITE LANE | CROSSING LANE | ROADSIDE ZONE | ... |
|---|---|---|---|---|---|---|---|---|---|---|---|
| INTERSECTION | | | ○ | ○ | | | | | ◎ | | |
| MAIN ROAD | | ■ | ■ | ■ | ◎ | | ◎ | | | ○ | |
| GENERAL ROAD | ○ | | | | ◎ | | ○ | ○ | | | |
| CITY AREA | ○ | | | | ◎ | | ○ | | | | |
| ... | | | | | | | | | | | |

(b)

| TRAFFIC SCENE | OBJECT | OPERATION/STATE |
|---|---|---|
| INTERSECTION | SIGNAL LIGHT | RED, GREEN, YELLOW, ... |
| INTERSECTION | CROSSWALK | ABSENCE OF PEDESTRIAN, PRESENCE OF PEDESTRIAN, ... |
| INTERSECTION | CAR | RIGHT TURN, LEFT TURN, STRAIGHT DRIVING, ... |
| HIGHWAY | CAR | DURING TRAVELING, LANE CHANGE, MERGING, ... |
| ... | | ... |

1. A *sunny day* on an *open road*. There are <u>one man</u> and <u>one car</u>.

2. There is a *median strip* on an *open road*.

3. The <u>man</u> is on the left of *lane R1*.

4. The <u>man</u> is <u>standing</u> on a *safety zone*.

5. There is a *fence* on the left of *lane R1*.

6. There are two signal lights far away.

7. There is a <u>car</u> behind *the crosswalk* on *the opposite lane*.

| CLASSIFICATION 1 | CLASSIFICATION 2 | PRIORITY SETTING |
|---|---|---|
| INSIDE TRAVELING LANE OF HOST VEHICLE | — | HIGH |
| OUTSIDE TRAVELING LANE OF HOST VEHICLE | NOT APPROACHING TRAVELING LANE OF HOST VEHICLE | LOW |
| OUTSIDE TRAVELING LANE OF HOST VEHICLE | APPROACHING TRAVELING LANE OF HOST VEHICLE | HIGH |

FIG. 13

1. A *sunny day* near an *intersection*.
2. A median strip *area* is on the right. A road shoulder is on the left.
   The *turn left line* is in the middle.
3. One person is crossing the *left crosswalk*. Two persons are waiting on the *left crosswalk*.
   Three persons are on the *intersection* far away. No person is on *the front crosswalk*.
4. A car is waiting on *the turn left line* before the *stop line*.
   A motorcycle is waiting on the *direct line* before the *stop line*.
5. A bus is crossing the *intersection* from the left to the right.
6. There are six signal lights from near left to the front of *the road*.

FIG. 15

1. A *night* on a *highway road*. There is no person.
2. There is a median strip on the right.
   *Three lanes* are on the left of the median strip.
3. There are *turn right, direct line, direct line.*
4. There is a truck 1 on the near left of the *lane R2*.
   There is a truck 2 before the truck 1.
   There are two cars before truck 2.
5. There is a car between the *lane R1* and *lane R2* far away.
   There are two cars between the median strip and the *lane R0* far away.
6. There is a turn left traffic sign far away.
   There are direct, turn right traffic signs on the right of the turn left traffic sign.
7. There are *four street lights* on the median strip area.

RECOGNITION PROCESSING DEVICE, VEHICLE CONTROL DEVICE, RECOGNITION CONTROL METHOD, AND STORAGE MEDIUM

CROSS-REFERENCE TO RELATED APPLICATION

Priority is claimed on Japanese Patent Application No. 2018-113053, filed Jun. 13, 2018, the content of which is incorporated herein by reference.

BACKGROUND OF THE INVENTION

Field of the Invention

The present invention relates to a recognition processing device, a vehicle control device, a recognition control method, and a storage medium.

Description of Related Art

Conventionally, technology for recognizing an image or a moving image and converting the image or the like into a plain sentence (in other words, converting the image or the like into a sentence or a word string) has been disclosed (for example, Japanese Unexamined Patent Application, First Publication No. 2000-221991). According to the technology disclosed in Japanese Unexamined Patent Application, First Publication No. 2000-221991, an appropriate word string is estimated and provided by recognizing an image in which a person who is being shown uses sign language and outputting word string candidates representing natural language meanings represented by a sign language pattern of the person.

However, in the conventional technology, a natural language text sentence generation process capable of comprehensively representing an overall peripheral situation instead of a segmental word string representing a very small part of the peripheral situation has not been specifically considered.

An aspect of the present invention has been made in consideration of such circumstances and an objective of the present invention is to provide a recognition processing device, a vehicle control device, a recognition control method, and a storage medium capable of generating text for comprehensively predicting a change in a peripheral situation of a vehicle.

SUMMARY OF THE INVENTION

A recognition processing device, a vehicle control device, a recognition control method, and a storage medium according to the present invention adopt the following configurations.

(1): According to an aspect of the present invention, there is provided a recognition processing device including: a peripheral situation recognition unit configured to recognize a type of object around a vehicle and a positional relationship with the vehicle; an object recognition unit configured to select a word indicating the type of object recognized by the peripheral situation recognition unit and a word indicating a positional relationship between the vehicle and the object; and a text generation unit configured to generate text for describing a peripheral situation recognized by the peripheral situation recognition unit, wherein the text includes the word indicating the type of object selected by the object recognition unit and the word indicating the positional relationship between the vehicle and the object selected by the object recognition unit and is generated in accordance with a prescribed grammar.

(2): In the aspect (1), the text generation unit sets priority by identifying the object having a large influence on the vehicle among objects and preferentially includes the word for describing the peripheral situation including the object with high priority in the text.

(3): In the aspect (1), the text generation unit sets priority by identifying the object having a large influence on the vehicle among objects and causes the text for describing the peripheral situation including the object with high priority to be preferentially disposed in a higher-order paragraph among paragraphs constituting the text.

(4): In the aspect (1), the text generation unit sets priority by identifying a positional relationship between a plurality of objects having a large influence on the vehicle among objects and preferentially includes the word for describing the peripheral situation including a positional relationship between the objects having high priority in the text.

(5): According to an aspect of the present invention, there is provided a vehicle control device including: the recognition processing device according to any one of (1) to (4); a text analysis unit configured to predict a change in a peripheral situation on the basis of the text; and a driving control unit configured to execute driving control for controlling one or both of steering and acceleration/deceleration of the vehicle on the basis of the text generated by the text generation unit of the recognition processing device.

(6): In the aspect (5), the text analysis unit analyzes whether the text is text indicating the peripheral situation that is able to occur due to an attribute of the object, outputs the text generated by the text generation unit when it is analyzed that the text is text indicating the peripheral situation that is able to occur due to the attribute of the object, and discards the text generated by the text generation unit when it is analyzed that the text is not text indicating the peripheral situation that is able to occur due to the attribute of the object.

(7): According to an aspect of the present invention, there is provided a recognition control method including: recognizing, by a computer, a type of object around a vehicle and a positional relationship with the vehicle; selecting, by the computer, a word indicating the recognized type of object and a word indicating a positional relationship between the vehicle and the object; and generating, by the computer, text for describing a recognized peripheral situation, wherein the text includes the selected word indicating the type of object and the word indicating the positional relationship between the vehicle and the object and is generated in accordance with a prescribed grammar.

(8): According to an aspect of the present invention, there is provided a computer-readable non-transitory storage medium storing a program for causing a computer to: recognize a type of object around a vehicle and a positional relationship with the vehicle; select a word indicating the recognized type of object and a word indicating a positional relationship between the vehicle and the object; and generate text for describing a recognized peripheral situation, wherein the text includes the selected word indicating the type of object and the word indicating the positional relationship between the vehicle and the object and is generated in accordance with a prescribed grammar.

According to the aspects (1) to (8), it is possible to generate text for comprehensively predicting a change in a situation around a vehicle.

BRIEF DESCRIPTION OF THE DRAWINGS

FIG. 7 is a diagram showing an example of a traffic scene selection rule of the traffic scene selection unit.

FIG. 13 is a diagram for describing the text generation process of the text generation unit.

FIG. 15 is a diagram for describing the text generation process of the text generation unit.

DETAILED DESCRIPTION OF THE INVENTION

Hereinafter, embodiments of a recognition processing device, a vehicle control device, a recognition control method, and a storage medium of the present invention will be described with reference to the drawings.

[Overall Configuration]

Figure 1:
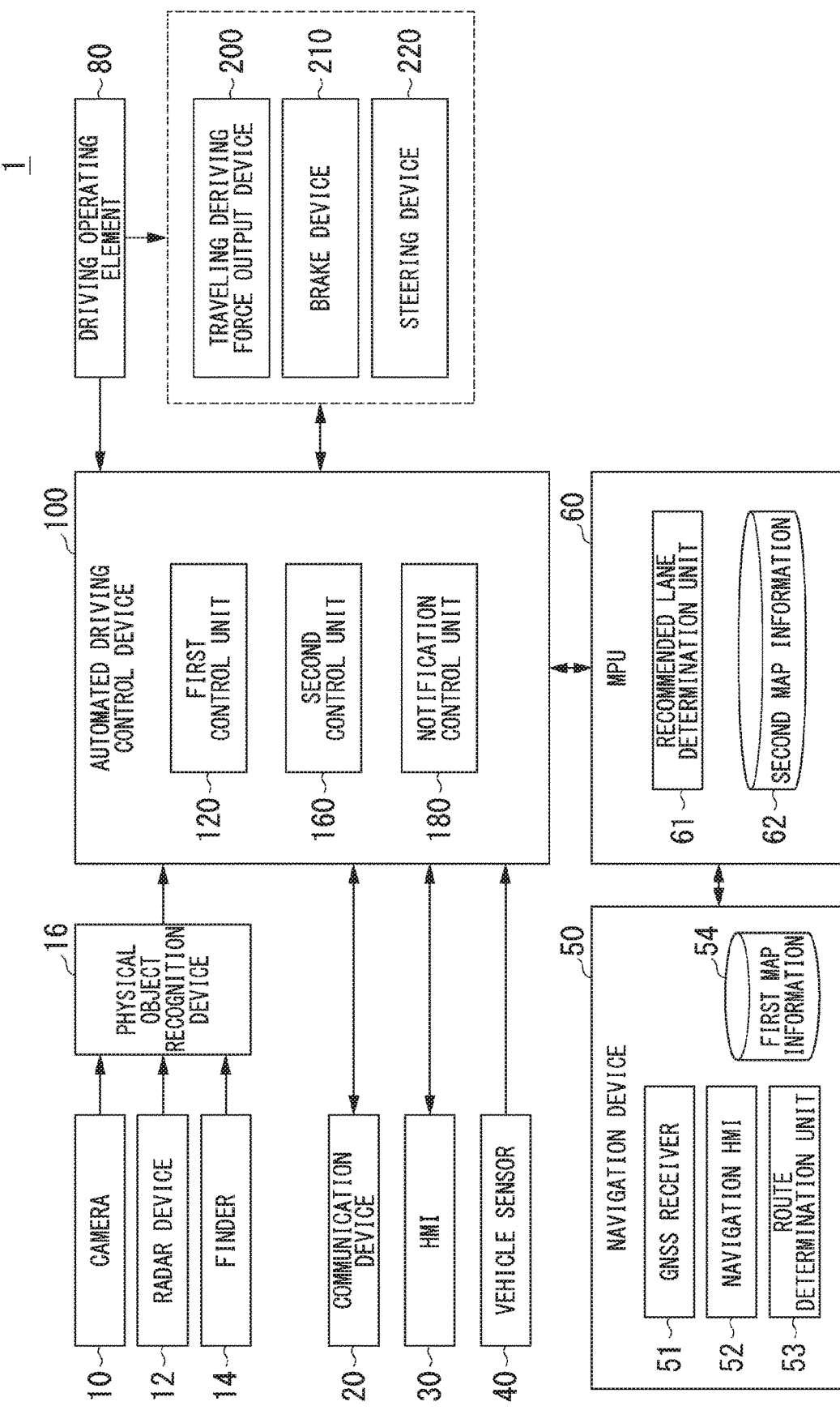
FIG. 1 is a configuration diagram of a vehicle control device according to an embodiment.

FIG. 1 is a configuration diagram of a vehicle control device 1 according to the embodiment. A vehicle equipped with the vehicle control device 1 is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a power generator connected to the internal combustion engine, or discharge power of a secondary battery or a fuel cell.

The vehicle control device 1 includes, for example, a camera 10, a radar device 12, a finder 14, a physical object recognition device 16, a communication device 20, a human machine interface (HMI) 30, a vehicle sensor 40, a navigation device 50, a map positioning unit (MPU) 60, a driving operating element 80, an automated driving control device 100, a traveling driving force output device 200, a brake device 210, and a steering device 220. These devices and apparatuses are connected to each other by a multiplex communication line such as a controller area network (CAN) communication line, a serial communication line, a wireless communication network, or the like. Also, the configuration illustrated in FIG. 1 is merely an example, and a part of the configuration may be omitted or other components may be further added.

For example, the camera 10 is a digital camera using a solid-state imaging device such as a charge coupled device (CCD) or a complementary metal oxide semiconductor (CMOS). The camera 10 is attached to any position on the host vehicle M on which the vehicle control device 1 is mounted. When a view in front thereof is imaged, the camera 10 is attached to an upper portion of a front windshield, a rear surface of a rearview mirror, or the like. For example, the camera 10 periodically and iteratively images the vicinity of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any position on the host vehicle M. The radar device 12 may detect a position and a speed of the physical object in a frequency modulated continuous wave (FM-CW) scheme.

The finder 14 is a light detection and ranging (LIDAR) finder. The finder 14 radiates light in the vicinity of the host vehicle M and measures scattered light. The finder 14 detects a distance to an object on the basis of a time from light emission to light reception. The radiated light is, for example, pulsed laser light. The finder 14 is attached to any position on the host vehicle M.

The physical object recognition device 16 performs a sensor fusion process on detection results from some or all of the camera 10, the radar device 12, and the finder 14 to recognize a position, a type, a speed, and the like of a physical object. The physical object recognition device 16 outputs recognition results to the automated driving control device 100. The physical object recognition device 16 may output detection results of the camera 10, the radar device 12, and the finder 14 to the automated driving control device 100 as they are. The physical object recognition device 16 may be omitted from the vehicle control device 1.

The communication device 20 communicates with other vehicles present in the vicinity of the host vehicle M using, for example, a cellular network, a Wi-Fi network, Bluetooth (registered trademark), dedicated short range communication (DSRC), or the like or communicates with various types of server devices via a wireless base station.

The HMI 30 presents various types of information to an occupant within the host vehicle M and receives an operation input by the occupant. The HMI 30 includes various types of display devices, a speaker, a buzzer, a touch panel, a switch, keys, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, or the like.

For example, the navigation device 50 includes a global navigation satellite system (GNSS) receiver 51, a navigation HMI 52, and a route determination unit 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determination unit 53 determines a route (for example, a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by a link. The first map information 54 may include a curvature of a road, point of interest (POI) information, and the like. The route on the map is output to the MPU 60. The navigation device 50 may perform route guidance using the navigation HMI 52 on the basis of the route on the map. For example, the navigation device 50 may be implemented by a function of a terminal device such as a smartphone or a tablet terminal owned by the occupant. The navigation device 50 may transmit a current position and a destination to a navigation server via the communication device 20 and acquire a route equivalent to the route on the map from the navigation server.

For example, the MPU 60 includes a recommended lane determination unit 61 and stores second map information 62 in a storage device such as an HDD or a flash memory. The recommended lane determination unit 61 divides the route on the map provided from the navigation device 50 into a plurality of blocks (for example, divides the route every 100 [m] with respect to a traveling direction of the vehicle), and determines a recommended lane for each block with reference to the second map information 62. The recommended lane determination unit 61 determines on what lane numbered from the left the vehicle will travel. The recommended lane determination unit 61 determines the recommended lane so that the host vehicle M can travel along a reasonable traveling route for traveling to a junction destination when there is a junction in a route on the map.

The second map information 62 is map information which has higher accuracy than the first map information 54. For example, the second map information 62 includes information about a center of a lane or information about a boundary of a lane. Also, the second map information 62 may include road information, traffic regulations information, address information (an address/zip code), facility information, telephone number information, and the like. The second map information 62 may be updated as needed when the communication device 20 communicates with other devices.

For example, the driving operating element 80 includes an accelerator pedal, a brake pedal, a shift lever, a steering wheel, a variant steer, a joystick, and other operating elements. A sensor configured to detect an amount of operation or the presence or absence of an operation is attached to the driving operating element 80, and a detection result thereof is output to the automated driving control device 100 or one or all of the traveling driving force output device 200, the brake device 210, and the steering device 220.

For example, the automated driving control device 100 includes a first control unit 120 and a second control unit 160. For example, each of the first control unit 120 and the second control unit 160 is implemented by a hardware processor such as a central processing unit (CPU) executing a program (software). Some or all of the functional elements thereof are implemented, for example, by hardware (a circuit unit including circuitry) such as large scale integration (LSI), an application specific integrated circuit (ASIC), a field-programmable gate array (FPGA), or a graphics processing unit (GPU) or may be implemented by cooperation between software and hardware. The program may be pre-stored in a storage device such as an HDD or a flash memory of the automated driving control device 100 and may be stored in a removable storage medium such as a DVD or a CD-ROM and installed in the storage device such as the HDD or the flash memory of the automated driving control device 100 when the storage medium is mounted in a drive device.

Figure 2:
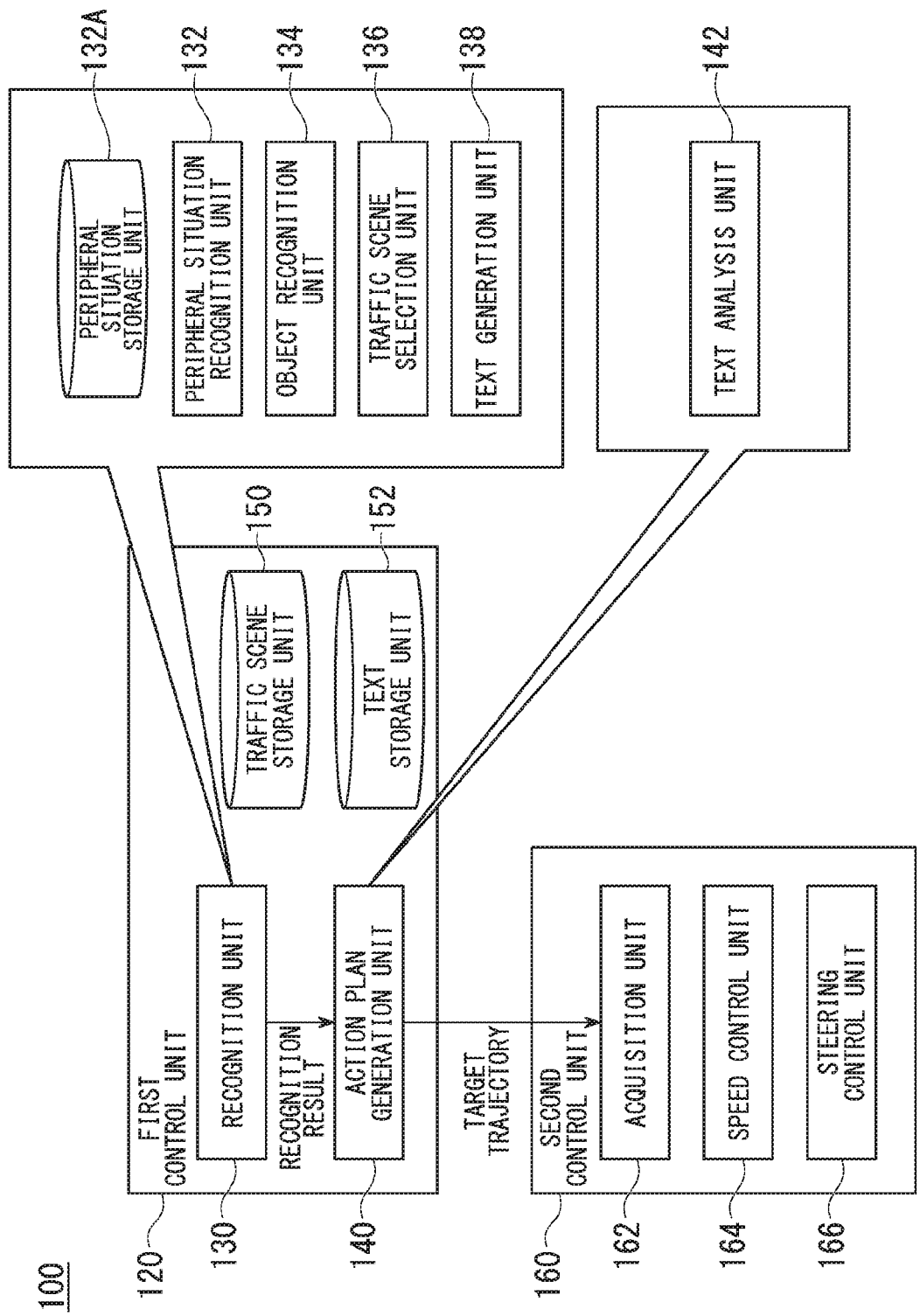
FIG. 2 is a functional configuration diagram of a first control unit and a second control unit.

FIG. 2 is a functional configuration diagram of the first control unit 120 and the second control unit 160. The first control unit 120 includes, for example, a recognition unit 130 and an action plan generation unit 140. For example, the first control unit 120 implements a function based on artificial intelligence (AI) and a function based on a previously given model in parallel. For example, an "intersection recognition" function may be implemented by executing intersection recognition based on deep learning or the like and recognition based on previously given conditions (signals capable of pattern matching, road signs, or the like) in parallel and performing comprehensive evaluation by assigning scores to both the recognitions. Thereby, the reliability of automated driving is secured.

For example, the recognition unit 130 includes a peripheral situation recognition unit 132, an object recognition unit 134, a traffic scene selection unit 136, and a text generation unit 138. The peripheral situation recognition unit 132 recognizes states of a position, a speed, acceleration, and the like of a physical object present in the vicinity of the host vehicle M on the basis of information input from the camera 10, the radar device 12, and the finder 14 via the physical object recognition device 16. For example, the position of the physical object is recognized as a position on an absolute coordinate with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the peripheral situation recognition unit 132 recognizes a lane (a traveling lane) in which the host vehicle M is traveling. For example, the peripheral situation recognition unit 132 recognizes the traveling lane by comparing a pattern of a road dividing line (for example, an arrangement of solid lines and broken lines) obtained from the second map information 62 with a pattern of a road dividing line in the vicinity of the host vehicle M recognized from an image captured by the camera 10. The peripheral situation recognition unit 132 may recognize a host vehicle line or an adjacent lane by recognizing a traveling path boundary (a road boundary) including a road dividing line, a road shoulder, a curb stone, a median strip, a guardrail, or the like as well as a road dividing line. In this recognition, a position of the host vehicle M acquired from the navigation device 50 or a processing result of the INS may be added. The peripheral situation recognition unit 132 recognizes a stop line, an obstacle, red signal light, a toll gate, and other road events.

When the traveling lane is recognized, the peripheral situation recognition unit 132 recognizes a relative position or orientation of the host vehicle M with respect to the traveling lane. For example, the peripheral situation recognition unit 132 may recognize a deviation of a reference point of the host vehicle M from the center of the lane and an angle formed with respect to a line connecting the center of the lane in the traveling direction of the host vehicle M as a relative position and an orientation of the host vehicle M with respect to the traveling lane. Instead, the peripheral situation recognition unit 132 may recognize a position of the reference point of the host vehicle M relative to one side end portion (a road dividing line or a road boundary) of the traveling lane as a relative position of the host vehicle M with respect to the traveling lane.

The peripheral situation recognition unit 132 separately recognizes a traveling lane, a traveling road boundary, a roadside zone, a sidewalk (hereinafter referred to as a road environment) and traffic participants (other vehicles, bicycles, pedestrians, and the like) around the host vehicle M. The peripheral situation recognition unit 132 distinguishes, for example, whether the recognized object is a traffic participant or a road environment on the basis of a relative speed of the recognized object with respect to the host vehicle M in the same direction as the traveling direction of the host vehicle M. The peripheral situation recognition unit 132 recognizes types of road environment and traffic participant around the vehicle and a positional relationship between the recognized road environment or traffic participant and the host vehicle M. The peripheral situation recognition unit 132 may derive the positional relationship between the traffic participants on the basis of the positional relationship between the recognized road environment or traffic participant and the host vehicle M.

The peripheral situation recognition unit 132 may distinguish that the recognized object is a physical object when the relative speed of the recognized object is different from that of the host vehicle M or changed and may distinguish that the recognized object is a road environment when the relative speed of the recognized object is substantially same as that of the host vehicle M. Accordingly, the peripheral situation recognition unit 132 recognizes a stop line, a crosswalk, a road sign, a traffic sign, an obstacle, red signal light, a toll gate, and other road events as traffic participants instead of the road environment. For example, the peripheral situation recognition unit 132 identifies a type of traffic participant on the basis of an identifier stored in a peripheral situation storage unit 132A. The identifier is software (a data structure) generated in advance according to machine learning such as deep learning using images of various types of traffic participants and the like as teacher data and outputs whether or not the recognized object is a traffic participant and a type thereof when an image, an image feature quantity, and data of another identification object are input. An object recognition unit 134, a traffic scene selection unit 136 and a text generation unit 138 will be described below.

The action plan generation unit 140 generates a future target trajectory along which the host vehicle M automatically travels (independently of a driver's operation) so that the host vehicle M generally travels in the recommended lane determined by the recommended lane determination unit 61 and further copes with a peripheral situation of the host vehicle M. For example, the target trajectory includes a speed element. For example, the target trajectory is represented by sequentially arranging points (trajectory points) at which the host vehicle M is required to arrive. The trajectory point is a point where the host vehicle M is required to reach for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the host vehicle M is required to arrive at the sampling time for each prescribed sampling time. In this case, information about the target speed or the target acceleration is represented by an interval between the trajectory points.

The action plan generation unit 140 may set an automatic driving event when the target trajectory is generated. The automatic driving event includes a constant-speed traveling event, a low-speed following traveling event, a lane change event, a junction event, an interchange event, a takeover event and the like. The action plan generation unit 140 generates a target trajectory according to the activated event.

The action plan generation unit 140 includes, for example, a text analysis unit 142. The text analysis unit 142 will be described below.

The second control unit 160 controls the traveling driving force output device 200, the brake device 210, and the steering device 220 so that the host vehicle M passes through the target trajectory generated by the action plan generation unit 140 at a scheduled time.

The second control unit 160 includes, for example, an acquisition unit 162, a speed control unit 164, and a steering control unit 166. The acquisition unit 162 acquires information about a target trajectory (an orbit point) generated by the action plan generation unit 140, and causes the information to be stored in a memory (not shown). The speed control unit 164 controls the traveling driving force output device 200 or the brake device 210 on the basis of the speed element associated with the target trajectory stored in the memory. The steering control unit 166 controls the steering device 220 in accordance with a degree of bending of the target trajectory stored in the memory. For example, processes of the speed control unit 164 and the steering control unit 166 are implemented by a combination of feed-forward control and feedback control. As one example, the steering control unit 166 combines and executes feed-forward control according to the curvature of the road in front of the host vehicle M and feedback control based on a deviation from the target trajectory.

Returning to FIG. 1, the traveling driving force output device 200 outputs a traveling driving force (a torque) to driving wheels so as to allow the vehicle to travel. For example, the traveling driving force output device 200 includes a combination of an internal combustion engine, an electric motor, a transmission, and the like, and an electric control unit (ECU) configured to control them. The ECU controls the above-described configuration in accordance with information input from the second control unit 160 or information input from the driving operating element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with information input from the second control unit 160 or information input from the driving operating element 80 so that a brake torque corresponding to a braking operation is output to each wheel. The brake device 210 may include a mechanism for transferring the hydraulic pressure generated by the operation of the brake pedal included in the driving operating element 80 to the cylinder via the master cylinder as a backup. The brake device 210 is not limited to the above-described configuration and may be an electronically controlled hydraulic brake device that controls an actuator in accordance with information input from the second control unit 160 and transfers the hydraulic pressure of the master cylinder to the cylinder.

For example, the steering device 220 includes a steering ECU and an electric motor. The electric motor, for example, changes a direction of the steering wheels by applying a force to a rack and pinion mechanism. The steering ECU drives the electric motor and causes the direction of the steering wheels to be changed in accordance with the information input from the second control unit 160 or the information input from the driving operating element 80.

A combination of the peripheral situation recognition unit 132, the peripheral situation storage unit 132A, the object recognition unit 134, the traffic scene selection unit 136, and the text generation unit 138 among the components described above is an example of a recognition processing device. What a configuration in which the action plan generation unit 140 and the second control unit 160 are further added to the recognition processing device is an example of a vehicle control device.

[Configuration of First Control Unit]

Figure 3:
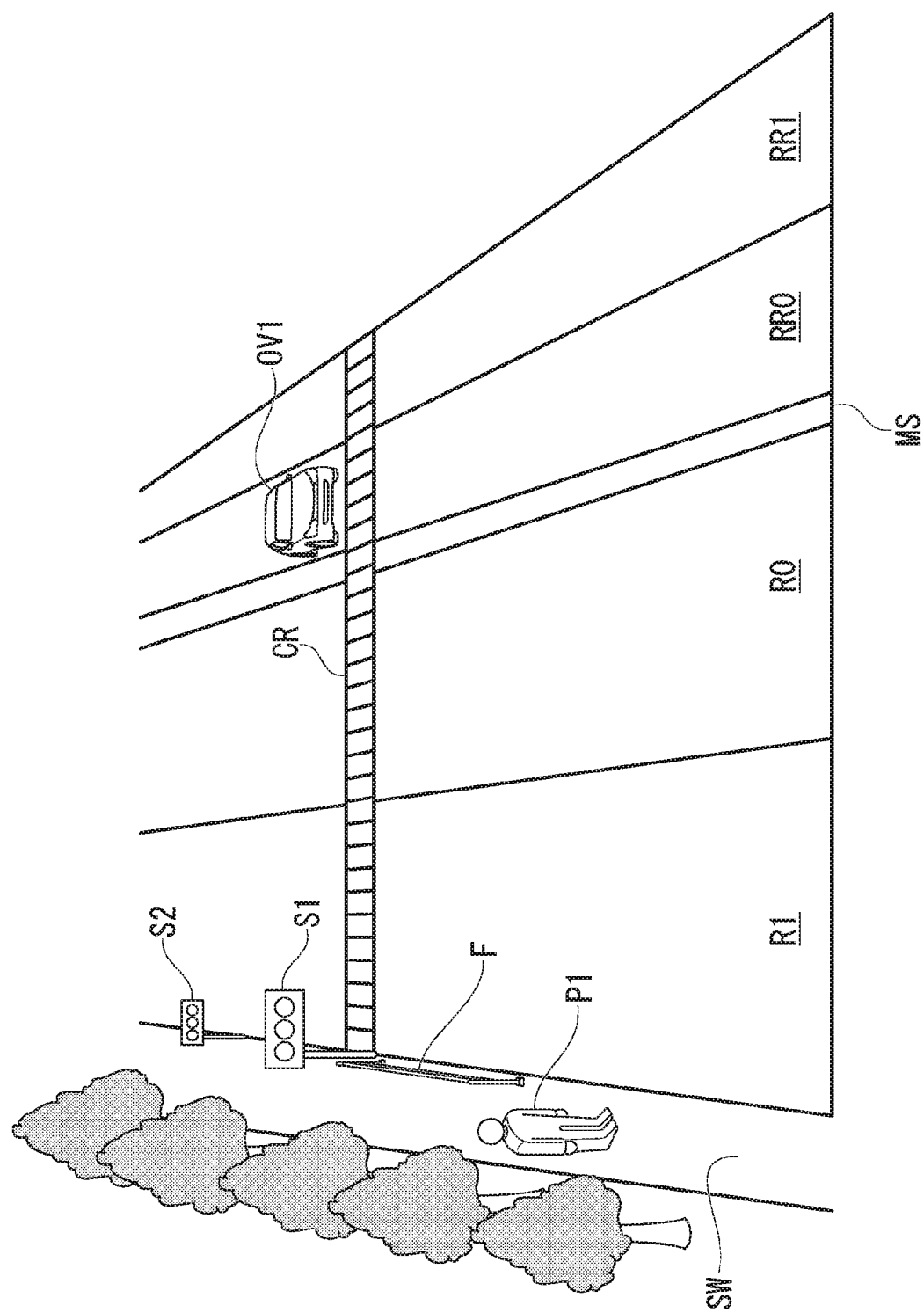
FIG. 3 is a diagram for describing a process of a peripheral situation recognition unit.

The object recognition unit 134 will be described with reference to FIGS. 3 and 4. FIG. 3 is a diagram for describing the process of the peripheral situation recognition unit 132 and is a schematic diagram showing an image in which a view in front of the host vehicle M in a traveling direction is imaged by the camera 10. In the example of FIG. 3, the peripheral situation recognition unit 132 recognizes each of a median strip MS, a lane R1 in which the host vehicle M is traveling, a lane R0 adjacent to the lane R1, opposite lanes RR0 and RR1, a crosswalk CR, a fence F between a sidewalk SW and the lane R1, and signal lights S1 and S2.

For example, the peripheral situation recognition unit 132 recognizes a pedestrian P1 on the sidewalk SW and recognizes another vehicle OV1 on an opposite lane a distance therefrom. The peripheral situation recognition unit 132 analyzes an image shown in FIG. 3 to recognize the appearance of the sky shown in the image. The peripheral situation recognition unit 132 outputs a recognition result of a sky part W to the object recognition unit 134.

Figure 4:
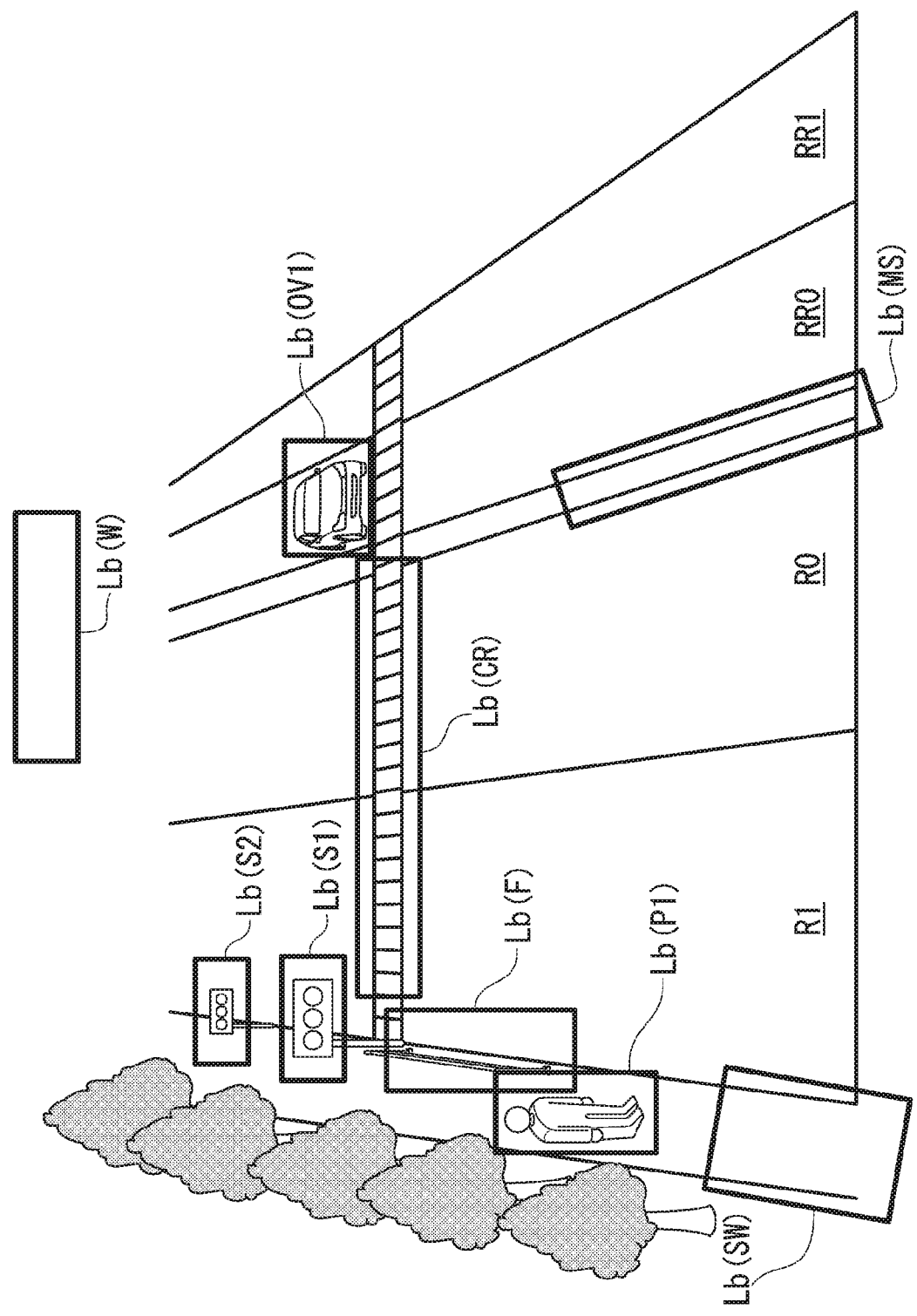
FIG. 4 is a diagram for describing a process of an object recognition unit.

FIG. 4 is a diagram for describing a process of the object recognition unit 134. The object recognition unit 134 identifies a traffic participant recognized by the peripheral situation recognition unit 132 and performs labeling for assigning information about a coordinate position of the traffic participant recognized by the peripheral situation recognition unit 132 and a label name (a label ID) to the traffic participant. The label name may include a type of traffic participant. The labeling may include setting a region occupied by the traffic participant. The object recognition unit 134 labels the traffic participant recognized by the peripheral situation recognition unit 132 to assign the label ID such as "Lb+(a code including a type of traffic participant)" indicating the traffic participant and sets a rectangular region including at least a part of the traffic participant recognized by the peripheral situation recognition unit 132 as a region.

For example, the object recognition unit 134 assigns the label ID "Lb(P1)" to the pedestrian P1 recognized by the peripheral situation recognition unit 132 and sets a rectangular region including a part or all of the pedestrian P1. "P" is a code indicating a pedestrian within the label ID and "1" is a code indicating which pedestrian. The label ID "Lb(W)" is assigned to the sky part W recognized by the peripheral situation recognition unit 132 and a rectangular region including the sky part W is set. The object recognition unit 134 may assign only a label ID indicating a type to a traffic participant who cannot be defined in a closed region as in the lane R1 without setting a region in the traffic participant.

Furthermore, the object recognition unit 134 groups the traffic participants on the basis of types of traffic participants that have been labeled and manages labeling processing results in units of groups. When the traffic participants subjected to the labeling process are another vehicle and a bus, the object recognition unit 134 may group the other vehicle and the bus into groups indicating "car" and "bus" or may group the other vehicle and the bus into a type name called "vehicles". The object recognition unit 134 associates a group of labeling results with a word or a phrase indicating the group. The word or phrase indicating the group is selected from, for example, words stored in the text storage unit 152. The present invention is not limited thereto. A type name indicating "car" is associated with a group indicating another vehicle and a type name indicating "bus" is associated with a group indicating a bus. The object recognition unit 134 may assign an identification number for individually identifying the traffic participant after the type name indicating the group as in "bus 1" and "bus 2" so that each traffic participant can be identified when a plurality of traffic participants are grouped into the same group.

For example, when road environments recognized by the peripheral situation recognition unit 132 are a traveling lane and a median strip, the object recognition unit 134 groups the traveling lane and the median strip into groups indicating "traveling lane" and "median strip".

The object recognition unit 134 sets information about an operation and a situation of the recognized traffic participant and information about an operation predicted to be performed by the traffic participant and a situation in association with a label ID. For example, when it is recognized that another vehicle recognized by the peripheral situation recognition unit 132 is turning to the right, the object recognition unit 134 adds information about the "right turn" to the label ID. The object recognition unit 134 outputs the label ID set by the labeling and accompanying information to the traffic scene selection unit 136. A result of labeling in the object recognition unit 134 shown in FIG. 4 may be displayed on the display device of the HMI 30.

The traffic scene selection unit 136 refers to the labeling result using the label ID output by the object recognition unit 134, recognizes a situation in which the host vehicle M is traveling on the basis of the labeling result that has been referred to, and selects an estimated traffic scene by estimating a situation that the host vehicle M will approach soon. The traffic scene is a traffic scene classified as an optimum type from among preset types related to the situation in which the host vehicle M is traveling or a situation that the host vehicle M will approach soon. For example, when the object recognition unit 134 has recognized an intersection in front of the host vehicle M, the traffic scene selection unit 136 selects an optimum traffic scene from traffic scenes related to an intersection stored in the traffic scene storage unit 150.

For example, when the labeling result from the object recognition unit 134 shown in FIG. 4 has been output, the traffic scene selection unit 136 recognizes that there are a plurality of lanes and that the signal light S1 and the crosswalk CR are labeled and selects a traffic scene "general road". The traffic scene selection unit 136 outputs the selected traffic scene and the label ID set by the object recognition unit 134 to the text generation unit 138. For example, when labeling results of a prescribed number of pedestrians or more have been recognized, the traffic scene selection unit 136 selects a traffic scene related to a commuting time period along with a time recognition result and map information from the communication device 20 and the like.

The text generation unit 138 generates text of at least one paragraph for describing a peripheral situation on the basis of the traffic scene and the label ID output by the traffic scene selection unit 136. The text indicating the peripheral situation includes, for example, text including words indicating a traffic participant and a road environment recognized by the peripheral situation recognition unit 132 or words indicating type names of the traffic participant and the road environment set by the object recognition unit 134 and a word indicating the traffic scene selected by the traffic scene selection unit 136.

For example, when the host vehicle M reaches an intersection and stops after a red light signal is seen, the text generation unit 138 generates text including a paragraph having a plain sentence "There is an intersection" or "The signal lights red in front of the road". The text generation unit 138 outputs the generated text to the text storage unit 152.

[Object Labeling]

Figures 5, 6:
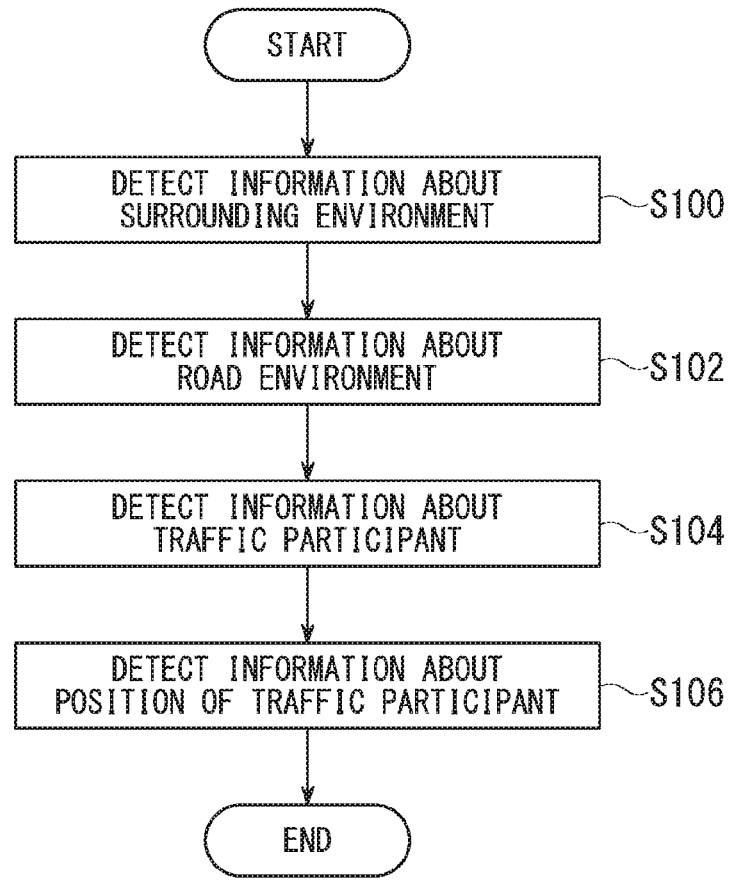
FIG. 5 is a diagram showing an example of an object recognized as a traffic participant or a road environment by a peripheral situation recognition unit.
FIG. 6 is a flowchart showing an example of a flow of a labeling process of the object recognition unit.

Hereinafter, labeling of traffic participants and road environments by the object recognition unit 134 will be described with reference to FIG. 5. FIG. 5 is a diagram showing an example of an object stored by the peripheral situation storage unit 132A and recognized as a traffic participant or a road environment by the peripheral situation recognition unit 132.

For example, as shown in FIG. 5, the object recognition unit 134 recognizes information about the surrounding environment, information about the road environment, information about the traffic participant, and information about a position of the traffic participant, and labels recognition results. The information about the position of the traffic participant may be information about a position of the traffic participant when the information is based on the host vehicle M, may be information indicating a positional relationship between the traffic participants, or may be information indicating an operation of the traffic participant.

Information about the environment recognized by the object recognition unit 134 includes, for example, a time, a season, a temperature, and the weather. The information about the environment recognized by the object recognition unit 134 may be derived from a result of recognizing the information about the environment in the peripheral situation recognition unit 132 when the physical object recognition device 16 can recognize the environment such as the weather of the peripheral situation. Alternatively, information acquired by the communication device 20 communicating with another device may be used.

The object recognition unit 134 selects and labels a name indicating a result of recognizing a traffic participant or a road environment around the host vehicle M recognized by the peripheral situation recognition unit 132 from information about a traffic participant and information about the road environment stored by the peripheral situation recognition unit 132A. Furthermore, the object recognition unit 134 selects and labels a name indicating a result of recognizing an operation or a situation of a traffic participant around the host vehicle M recognized by the peripheral situation recognition unit 132 from information about the operation or the situation of the traffic participant stored by the peripheral situation storage unit 132A.

FIG. 6 is a flowchart showing an example of a flow of a labeling process of the object recognition unit 134.

First, the object recognition unit 134 detects and labels information about a peripheral environment (step S100). Next, the object recognition unit 134 detects and labels information about a road environment (step S102). Next, the object recognition unit 134 detects and labels information about a traffic participant (step S104). Next, the object recognition unit 134 detects and labels information about a position of the traffic participant (step S106). Thus, the process of the present flowchart ends.

[Traffic Scene Selection]

Hereinafter, the selection of a traffic scene in the traffic scene selection unit 136 will be described using FIG. 7. FIG. 7 shows an example of a traffic scene and a traffic participant and a road environment related to the traffic scene stored by the peripheral situation storage unit 132A.

FIG. 7(*a*) is a diagram showing an example of a traffic scene selection rule in the traffic scene selection unit 136. The traffic scene selection unit 136 selects a traffic scene indicating a peripheral situation of the host vehicle M on the basis of the presence or absence of a traffic participant and a road environment labeled by the object recognition unit 134.

A double-circle mark shown in FIG. 7(*a*) indicates that an associated traffic scene can be derived when a traffic participant or the road environment has been recognized by the object recognition unit 134. For example, when the peripheral situation recognition unit 132 has recognized a crossing lane and the object recognition unit 134 has labeled the crossing lane, the traffic scene selection unit 136 selects that an associated traffic scene is an "intersection".

A circle mark shown in FIG. 7(*a*) indicates that the associated traffic participant or road environment is likely to be labeled by the object recognition unit 134 when a traffic scene has been derived. For example, when a traffic scene of an "intersection" has been selected, the traffic scene selection unit 136 estimates that another traffic participant (for example, a "signal light" or a "crosswalk") associated with the selected traffic scene is likely to be labeled by the object recognition unit 134 and outputs an estimation result to the object recognition unit 134. When a traffic participant corresponding to the traffic scene estimated to be likely to be labeled by the traffic scene selection unit 136 has been labeled, the object recognition unit 134 improves the accuracy of text generated by the text generation unit 138 indicating a peripheral situation by collecting labeling results thereof and outputting the collected labeling results to the text generation unit 138. When the traffic participant corresponding to the traffic scene estimated to be likely to be labeled by the traffic scene selection unit 136 has not been labeled, the object recognition unit 134 can cope with a labeling error in the object recognition unit 134 at an early stage by outputting information about the traffic participant estimated to be likely to be labeled by the object recognition unit 134 or a group to which the traffic participant belongs.

Square marks shown in FIG. 7(*a*) indicate a traffic participant and a road environment that are not associated when the traffic scene has been derived. For example, the traffic scene selection unit 136 selects that an associated traffic scene is a "main road" when a pedestrian, a signal light, and a crosswalk are not labeled by the object recognition unit 134 or when a labeling proportion is less than or equal to a prescribed proportion and when the number of times a traveling lane or a traffic sign is labeled is less than or equal to a prescribed proportion.

As described above, the traffic scene selection unit 136 selects the traffic scene indicating the peripheral situation of the host vehicle M on the basis of the presence or absence of the traffic participant and the road environment labeled by the object recognition unit 134.

FIG. 7(*b*) is a diagram showing a traffic scene, a traffic participant associated with the traffic scene, and an operation or a selection rule of the traffic participant in a tabular form. For example, when the traffic scene selection unit 136 has already selected the "intersection" of the traffic scene and when the "crosswalk" of the traffic participant has been labeled by the object recognition unit 134, the traffic scene selection unit 136 estimates that the operation or the situation of the traffic participant associated with the "crosswalk" is likely to be labeled by the object recognition unit 134 on the basis of the table shown in FIG. 7(*b*) and outputs an estimation result to the object recognition unit 134. When traffic participants corresponding to the traffic scene estimated to be likely to be labeled by the traffic scene selection unit 136 have been labeled, the object recognition unit 134 improves the accuracy of text generated by the text generation unit 138 indicating a peripheral situation by collecting labeling results thereof and outputting the collected labeling results to the text generation unit 138.

When an operation or a situation of the traffic participant corresponding to a traffic scene estimated to be likely to be labeled by the traffic scene selection unit 136 has not been labeled, the object recognition unit 134 can detect a labeling error of the object recognition unit 134 at an early stage and take a countermeasure by outputting information about the operation or the situation of the traffic participant corresponding to the traffic scene estimated to be likely to be labeled and a group to which the operation or the situation of the traffic participant belongs to the object recognition unit 134.

In the relationship table shown in FIG. 7(*b*), for example, a relationship between a traffic participant for which a manufacturer of the host vehicle M or the like causes the text generation unit 138 to preferentially generate text and an operation or a situation of the traffic participant is set. The traffic scene selection unit 136 can improve the accuracy of text generated by the text generation unit 138 indicating a peripheral situation by selecting a traffic scene on the basis of the relationship shown in FIG. 7(*b*) and outputting the selected traffic scene to the text generation unit 138.

Figures 8, 9:
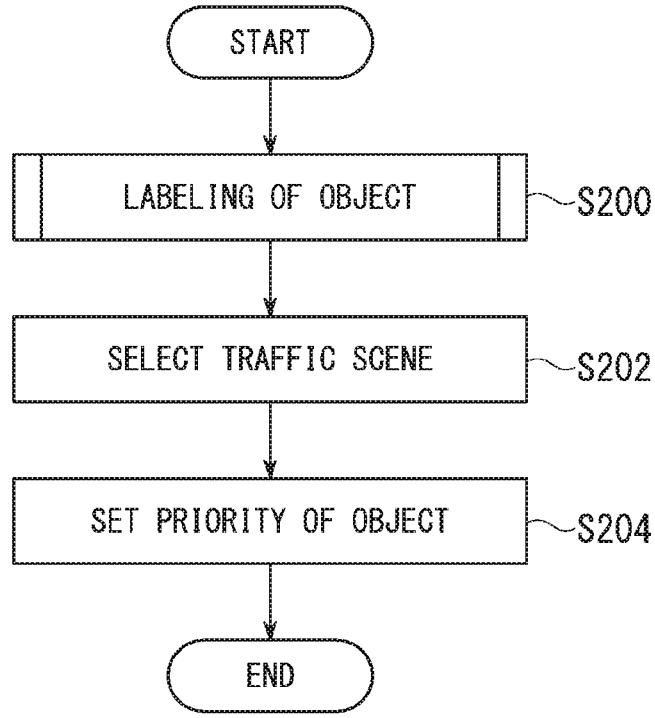
FIG. 8 is a flowchart showing an example of a flow of a traffic scene selection process of the traffic scene selection unit.
FIG. 9 is a diagram for describing a text generation process of a text generation unit.

FIG. 8 is a flowchart showing an example of a flow of a traffic scene selection process of the traffic scene selection unit 136. Step S200 is the process of the flowchart shown in FIG. 6.

First, the object recognition unit 134 labels a traffic participant and a road environment recognized by the peripheral situation recognition unit 132 and outputs labeling results to the traffic scene selection unit 136 (step S200). Next, the traffic scene selection unit 136 selects a traffic scene on the basis of the traffic participant and the road environment labeled by the object recognition unit 134 (step S202). Next, the traffic scene selection unit 136 outputs results of labeling the traffic participant, the road environment, and an operation or a situation of the traffic participant associated with the selected traffic scene to the text generation unit 138 (step S204). Thus, the process of the present flowchart ends.

[Text Generation]

FIG. 9 is a diagram for describing a text generation process of the text generation unit 138. The text generation unit 138 selects a word or a phrase serving as an output target on the basis of a traffic scene selected by the traffic scene selection unit 136 and a traffic participant, a road environment, and an operation or a situation of the traffic participant labeled by the object recognition unit 134 and causes the selected word or phrase to be reflected in text to be generated.

The text generation unit 138 generates, for example, text of seven paragraphs as shown in FIG. 9 from the labeling results of the object recognition unit 134 shown in FIG. 4. The text generation unit 138 may be configured to be able to identify a word or a phrase (for example, a word or a phrase indicating a traffic participant) needing a high degree of attention and a word or a phrase (for example, an article or a conjunction) needing a low degree of attention by color or size. For example, as shown in FIG. 9, the text generation unit 138 underlines a word or a phrase needing a high degree of attention indicating the traffic participant.

The text generation unit 138 causes a word or a phrase indicating a result of selecting the term "open road" selected by the traffic scene selection unit 136 to be reflected in a first paragraph (A sunny day on an open road. There are one man and one car.). Among sentences constituting the first paragraph, a term (for example, the term "There are") other than a word or a phrase indicating the selection result of the traffic scene selection unit 136 is an example of a template provided according to a prescribed grammar which is a rule when the text generation unit 138 generates text.

The text generation unit 138 reflects words or phrases containing a grouping result such as a sky part W (sunny day), a pedestrian P1 (one man), and another vehicle OV1 (one car) on the basis of the labeling results of the object recognition unit 134 in the first paragraph.

As shown in a second paragraph (There is a median strip on an open road.), the text generation unit 138 generates text in which a phrase indicating a result of selecting the term "general road" (open road) selected by the traffic scene selection unit 136 is reflected and a phrase indicating a median strip MS (median strip) which is a labeling result of the object recognition unit 134 is reflected. As shown in a third paragraph (The man is on the left of lane R1.), the text generation unit 138 generates text in which a word or a phrase indicating the term "left" indicating a position between the pedestrian P1 (man) and the lane R1 (lane R1) which are labeling results of the object recognition unit 134 is reflected.

The text generation unit 138 does not reflect a recognition result that may be noise among recognition results of the peripheral situation recognition unit 132 in the text indicating the peripheral situation to be generated. The recognition result that may be noise is, for example, a detailed recognition result such as an estimated gender or age of the pedestrian P1 recognized by the peripheral situation recognition unit 132 and is a recognition result that is not useful in driving control of the host vehicle M. The text generation unit 138 generates text that accurately indicates a possible event by excluding a recognition result that is likely not to be useful in driving control of the host vehicle M from text generation details. Therefore, the text analysis unit 142 to be described below can further improve robust stability by generating a target trajectory on the basis of text generated by the text generation unit 138 in comparison with a method of directly generating a target trajectory from a recognition result recognized by the peripheral situation recognition unit 132.

Figures 10, 11:
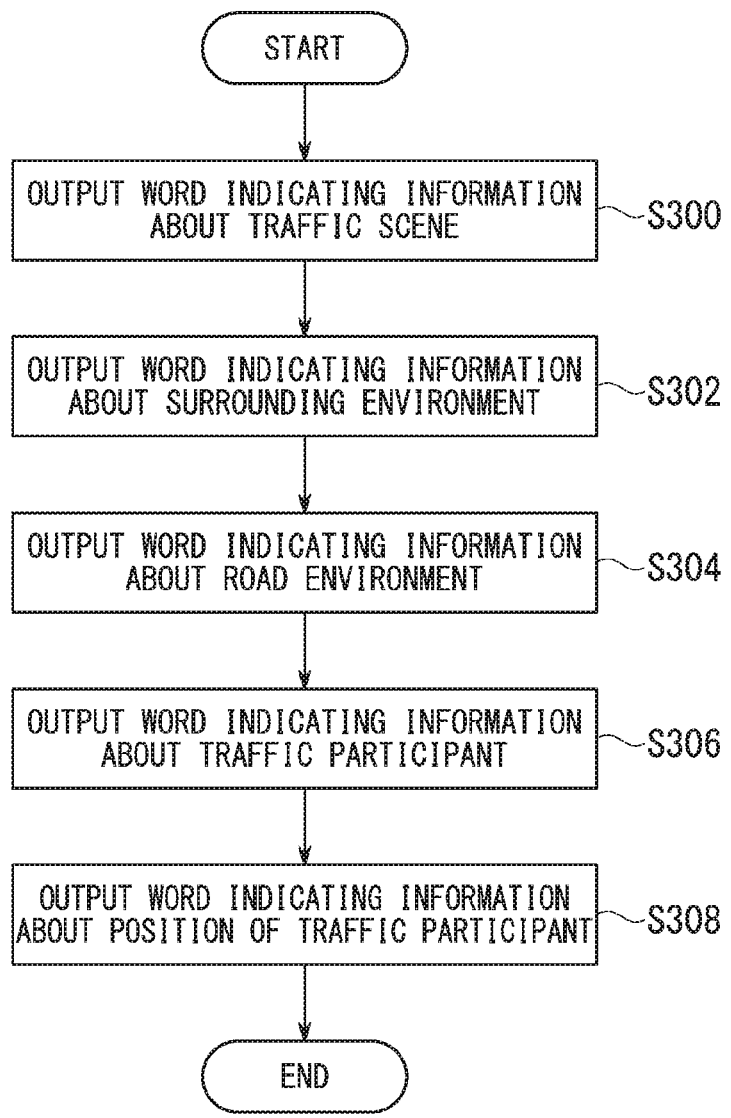
FIG. 10 is a flowchart showing an example of a flow of the text generation process of the text generation unit.
FIG. 11 is a diagram for describing priority of the text generation process of the text generation unit.

FIG. 10 is a flowchart showing an example of a flow of a text generation process of the text generation unit 138. The order of execution of the steps shown in FIG. 10 is not particularly limited and may be performed in another order.

First, the text generation unit 138 outputs a word or phrase related to a traffic scene (step S300). Next, the text generation unit 138 outputs a word indicating information about a surrounding environment (step S302). Next, the text generation unit 138 outputs a word indicating information about a road environment (step S304). Next, the text generation unit 138 outputs a word indicating information about a traffic participant (step S306). Next, the text generation unit 138 outputs a word indicating information about a position of the traffic participant (step S308). Thus, the process of the present flowchart ends.

Furthermore, for example, the text generation unit 138 generates text by increasing priority of text indicating a positional relationship or an action when a positional relationship between a traffic participant and a road environment having an influence on driving control of the host vehicle M or a change in the action of the traffic participant is indicated. The text generation unit 138 outputs the generated text to the action plan generation unit 140.

FIG. 11 is a diagram for describing the priority of the text generation process of the text generation unit 138. In FIG. 11, classification 1 indicates a positional relationship between a traffic participant labeled by the object recognition unit 134 and the host vehicle M and classification 2 indicates a change in an action of the traffic participant labeled by the object recognition unit 134. For example, when the traffic participant labeled by the object recognition unit 134 is located within the same travel lane as that of the host vehicle M, the priority is set to high priority. When the traffic participant labeled by the object recognition unit 134 is not located within the travel lane of the host vehicle M and when the traffic participant labeled by the object recognition unit 134 is not approaching the traveling lane of the host vehicle M, the priority is set to low priority.

The text generation unit 138 preferentially generates text including a word indicating a traffic participant whose priority is set to high priority. In the text shown in FIG. 9, a sentence constituting a first paragraph or a second paragraph includes a word indicating a traffic participant whose priority is set to high priority by the text generation unit 138. Although text related to the pedestrian P1 is output to a fourth paragraph in FIG. 9, this is a case in which the traffic participant labeled by the object recognition unit 134 is not located within the traveling lane of the host vehicle M and a case in which the traffic participant labeled by the object recognition unit 134 is not approaching the travel lane of the host vehicle M and this is because it is indicated that the priority is set to low priority. If the object recognition unit 134 labels that the pedestrian P1 is approaching the traveling lane R1 of the host vehicle M, the text generation unit 138 sets high priority for the pedestrian P1 and generates text indicating "The man is moving towards the lane R1." in a higher-order paragraph (for example, a first or second paragraph) for the text related to the pedestrian P1.

Although an example in which the text generation unit 138 sets the priority of a traffic participant located on the traveling lane R1 of the host vehicle M or a traffic participant labeled as approaching the traveling lane R1 to high priority is shown in FIG. 11, the priority may be set to high priority when a relative speed of the other vehicle OV1 traveling in the opposite lane RR0 is greater than or equal to a prescribed speed.

Figure 12:
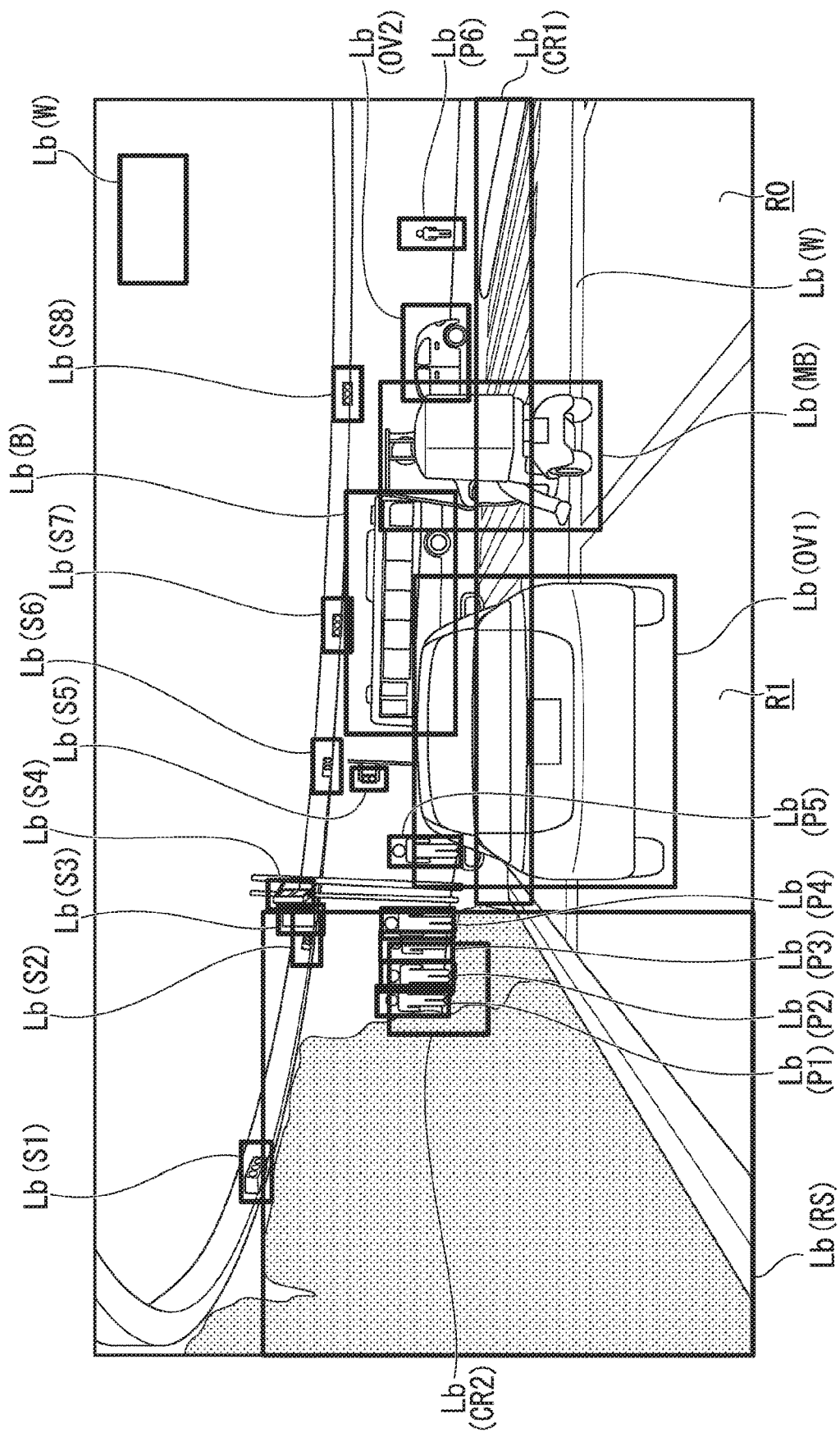
FIG. 12 is a diagram for describing processes of the peripheral situation recognition unit and an object recognition unit 134.

The priority setting by the text generation unit 138 will be described below with reference to FIGS. 12 to 15. FIG. 12 is a diagram for describing processes of the peripheral situation recognition unit 132 and the object recognition unit 134 and shows a peripheral situation recognized by the peripheral situation recognition unit 132 when the host vehicle M stops at an intersection while the host vehicle M is traveling on a general road in a city area.

In the example of FIG. 12, the peripheral situation recognition unit 132 recognizes each of a lane R1 in which the host vehicle M is traveling, a lane R0 adjacent to the lane R1, a stop line SL, a crosswalk CR1 adjacent to the stop line SL, a road shoulder RS adjacent to the lane R1, a crosswalk CR2 located in front of a left side of the host vehicle M in a traveling direction thereof, and signal lights S1 to S8. The peripheral situation recognition unit 132 recognizes another vehicle OV1 located on the same lane as the traveling lane R1 of the host vehicle M and stopping in front of the host vehicle M in a traveling direction thereof, a motorcycle MB located on the lane R0 adjacent to the traveling lane of the host vehicle M and stopping in front of the host vehicle M in a traveling direction thereof, pedestrians P1 to P6, and a bus B1 and other vehicles OV2 to OV4 on a crossing lane. The peripheral situation recognition unit 132 analyzes the image shown in FIG. 12 to recognize the appearance of the sky shown in the image. The peripheral situation recognition unit 132 outputs a result of recognizing the sky part W to the object recognition unit 134.

The object recognition unit 134 identifies the traffic participant recognized by the peripheral situation recognition unit 132 and performs a labeling process as in FIG. 4. For example, the object recognition unit 134 labels the pedestrians P1 to P6 recognized by the peripheral situation recognition unit 132, adds label IDs of Lb(P1) to Lb(P6), and sets a rectangular region including some or all of the pedestrians P1 to P6. The object recognition unit 134 outputs the label IDs set through labeling to the traffic scene selection unit 136. The traffic scene selection unit 136 refers to labeling results shown in FIG. 12 using the label IDs output by the object recognition unit 134 and selects a traffic scene related to an intersection.

The text generation unit 138 generates text indicating a peripheral situation of the host vehicle M shown in FIG. 12 on the basis of the traffic scene selected by the traffic scene selection unit 136, the traffic participant and the road environment labeled by the object recognition unit 134, and the operation or the situation of the traffic participants.

FIG. 13 is a diagram for describing the text generation process of the text generation unit 138. The text generation unit 138 generates text of six paragraphs as shown in FIG. 13 from labeling results of the object recognition unit 134 shown in FIG. 12. As shown in a first sentence (One person is crossing the left crosswalk.) of a third paragraph of the text shown in FIG. 13, the text generation unit 138 generates text in which a word or a phrase indicating a result of recognizing the pedestrian P1 as a labeling result of the object recognition unit 134 is reflected. As shown in a fourth sentence (No person is on the front crosswalk.) of the third paragraph of the text shown in FIG. 13, the text generation unit 138 generates text indicating that no pedestrian (No person) has been recognized in the vicinity of a crosswalk CR1 (front crosswalk) by the peripheral situation recognition unit 132.

On the other hand, the text generation unit 138 does not reflect words or phrases indicating the road shoulder RS or the other vehicles OV2 to OV4 on the intersection in the text shown in FIG. 13. This indicates that higher priority is set with respect to the other recognition results of the other vehicle OV1, the motorcycle MB, and the like among the recognition results of the object recognition unit 134 and the other recognition results with the higher priority are preferentially included in the text and therefore words indicating recognition results of the other vehicle OV2 to OV4 having lower priority than the other recognition results are not reflected in the text by the text generation unit 138.

As shown in a first sentence (A car is waiting on the turn left line before the stop line.) of a fourth paragraph of the text shown in FIG. 13, the text generation unit 138 generates text indicating a positional relationship between traffic participants such as a state in which the other vehicle OV1 has stopped in front of the stop line SL. In a sentence constituting a first sentence of the fourth paragraph, the term (for example, the term "is waiting on the" or "before the") other than words or phrases indicating the selection result from the traffic scene selection unit 136 is another example of a template when the text generation unit 138 generates text.

Figure 14:
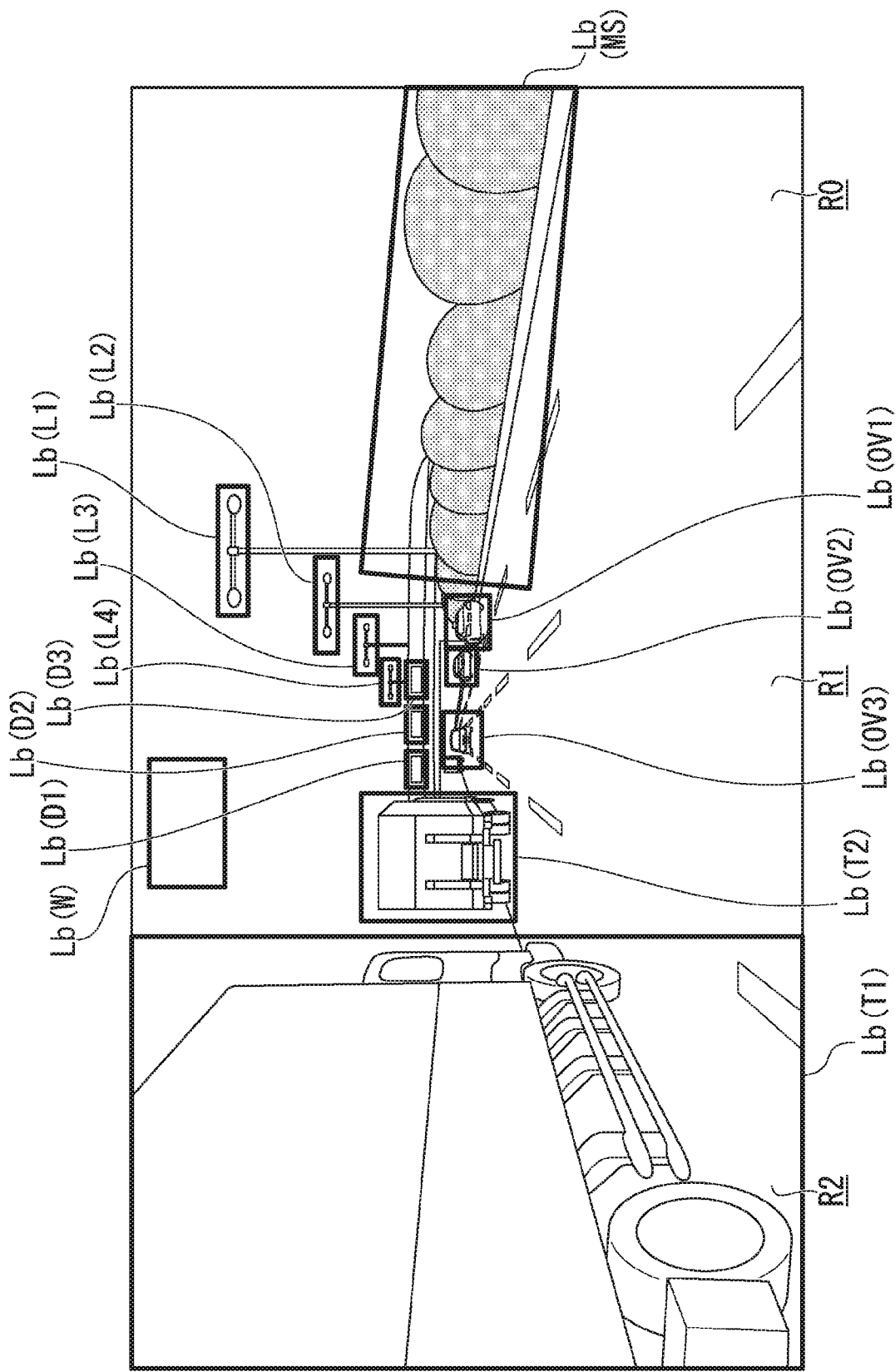
FIG. 14 is another diagram for describing processes of the peripheral situation recognition unit and the object recognition unit 134.

FIG. 14 is another diagram for describing processes of the peripheral situation recognition unit 132 and the object recognition unit 134 and shows a peripheral situation recognized by the peripheral situation recognition unit 132 while the host vehicle M is traveling on a main road at night.

In the example of FIG. 14, the peripheral situation recognition unit 132 recognizes each of a lane R1 in which the host vehicle M is traveling, lanes R0 and R2 adjacent to the lane R1, a median strip MS adjacent to the lane R0, traffic signs D1 to D3, and street lights L1 to L4. The peripheral situation recognition unit 132 recognizes other vehicles OV1 to OV3 located on the same lane as the traveling lane R1 of the host vehicle M and traveling in front of the host vehicle M in the traveling direction thereof and trucks T1 and T2. The peripheral situation recognition unit 132 analyzes the image shown in FIG. 14 to recognize the appearance of the sky reflected in the image, and outputs a recognition result of a sky part W to the object recognition unit 134.

The object recognition unit 134 identifies a traffic participant recognized by the peripheral situation recognition unit 132 and performs a labeling process as in FIGS. 4 and 12. The traffic scene selection unit 136 refers to the labeling result shown in FIG. 14 using a label ID output by the object recognition unit 134 and selects a traffic scene related to a main road at night. The text generation unit 138 generates text indicating the peripheral situation of the host vehicle M shown in FIG. 15 on the basis of a traffic scene selected by the traffic scene selection unit 136, a traffic participant and a road environment labeled by the object recognition unit 134, and an operation or a situation of the traffic participant.

FIG. 15 is a diagram for describing a text generation process of the text generation unit 138. The text generation unit 138 generates text of seven paragraphs as shown in FIG. 15 from the labeling results of the object recognition unit 134 shown in FIG. 14.

As shown in FIG. 15, second and third paragraphs of text contain words (lane and line) for lanes R0 to R2 and a fourth paragraph contains a word (truck) for trucks T1 and T2. This indicates that a sentence including a word indicating a result of recognizing the lanes R0 to R2 among recognition results of the object recognition unit 134 is disposed in a higher-order paragraph by the text generation unit 138 as a result of setting the priority of the result of recognizing the lanes R0 to R2 shown in a third paragraph to be higher than the priority of the result of recognizing the trucks T1 and T2 shown in the fourth paragraph. As shown in FIG. 13, a sixth paragraph of the text includes a word (traffic sign) related to traffic signs D1 to D3. This indicates that a sentence including a word indicating a result of recognizing the trucks T1 and T2 shown in the fourth paragraph among recognition results of the object recognition unit 134 is disposed in a paragraph lower than that of a sentence including a word indicating a result of recognizing the lanes R0 to R2 and disposed in a paragraph higher than that of a sentence including a word indicating a result of recognizing the traffic signs D1 to D3 by the text generation unit 138 as a result of setting the priority of the result of recognizing the trucks T1 and T2 shown in the fourth paragraph to be lower than the priority of the result of recognizing the lanes R0 to R2 shown in the third paragraph and higher than priority of the result of recognizing the traffic signs D1 to D3.

Figure 16:
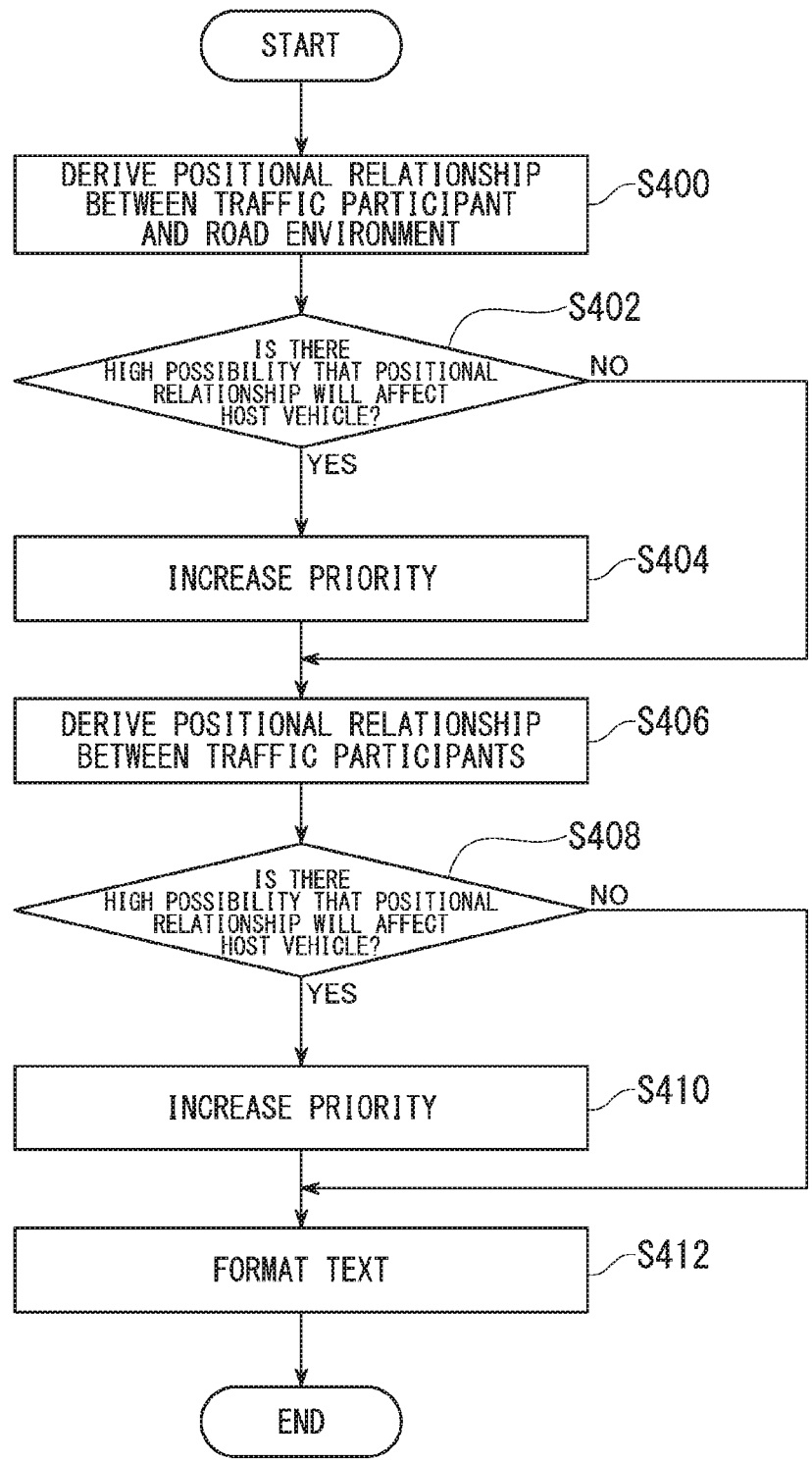
FIG. 16 is a flowchart showing an example of a flow of a process in which the text generation unit reflects the priority in text generation.

FIG. 16 is a flowchart showing an example of a flow of a process in which the text generation unit 138 reflects the priority in text generation. The execution order of steps S400 to S404 and steps S406 to S410 shown in FIG. 16 is not particularly limited. For example, steps S400 to S404 may be executed after steps S406 to S410 are executed.

First, the text generation unit 138 derives a positional relationship between a traffic participant and a road environment (step S400). Next, the text generation unit 138 determines whether or not there is a high possibility that a positional relationship between the traffic participant and the road environment will affect the driving control of the host vehicle M (step S402). When it is determined that there is a high possibility that a positional relationship between the traffic participant and the road environment will affect the driving control of the host vehicle M, the text generation unit 138 increases the output priority of the positional relationship between the traffic participant and the road environment (step S404). When it is determined that there is no high possibility that a positional relationship between the traffic participant and the road environment will affect the driving control of the host vehicle M, the text generation unit 138 moves the process to step S406.

The text generation unit 138 derives a positional relationship between traffic participants (step S406). Next, the text generation unit 138 determines whether or not there is a high possibility that the positional relationship between the traffic participants will affect the driving control of the host vehicle M (step S408). When it is determined that there is a high possibility that the positional relationship between the traffic participants will affect the driving control of the host vehicle M, the text generation unit 138 increases the output priority of the positional relationship between the traffic participants (step S410) and formats the entire text in accordance with a prescribed grammar using a template held by the text generation unit 138 (step S412). When it is determined that there is no high possibility that the positional relationship between the traffic participants will affect the driving control of the host vehicle M, the text generation unit 138 moves the process to step S412. Thus, the process of the present flowchart ends.

[Text Analysis]

The text analysis unit 142 generates a target trajectory on the basis of text output by the text generation unit 138. The text analysis unit 142 analyzes, for example, whether or not text shown in FIGS. 9, 13 and 15 accurately represents a peripheral situation, i.e., whether or not the situation shown in the text can actually occur. When the text analysis unit 142 analyzes that an event indicated by the text can actually occur, the text analysis unit 142 generates a target trajectory in consideration of the event indicated by the text. When the text analysis unit 142 analyzes that the event indicated by the text cannot actually occur, the text analysis unit 142 discards the text and generates a target trajectory from only text for which it is analyzed that the event can occur.

For example, the text generation unit 138 generates text including a sentence in which the corresponding event cannot occur due to attributes of the truck T2 and the median strip MS such as a sentence (There is a truck T2 on the median strip MS.) on the basis of the peripheral situation shown in FIG. 14 and outputs the generated text to the text analysis unit 142. When it is analyzed that the event indicated by the text output by the text generation unit 138 cannot actually occur, the text analysis unit 142 may discard the corresponding sentence "There is a truck T2 on the median strip MS." to generate a target trajectory from text other than the discarded sentence or may discard the entire text to cause the text generation unit 138 to generate text again.

In the text output by the text generation unit 138, it can be said that a result of recognizing an object related to driving control of the host vehicle M has been selected in comparison with a recognition result recognized by the peripheral situation recognition unit 132. Therefore, it is easy to perform standard unification when the text analysis unit 142 generates the target trajectory from the text generated by the text generation unit 138 and it is possible to reduce a processing cost required for generating the target trajectory.

Even when there are minor differences in the recognition results recognized by the peripheral situation recognition unit 132, similar events may be indicated and grouped. The text generation unit 138 generates text indicating the recognition result recognized by the peripheral situation recognition unit 132, so that it is possible to improve the accuracy of target trajectory prediction to be performed in the text analysis unit 142 by excluding information of a minor difference that may be ignored or decreasing the priority of the information.

A part of text unnecessary for target trajectory generation performed by the text analysis unit 142 may be deleted. For example, the text analysis unit 142 analyzes that a part or all of text may be discarded and deletes the text from the text storage unit 152 because text related to the street lights L1 to L4 shown in a seventh paragraph of the text shown in FIG. 15 has low priority for use when the target trajectory is generated.

According to the present embodiment as described above, the vehicle control device 1 includes the peripheral situation recognition unit 132 configured to recognize a peripheral situation of the host vehicle M; the object recognition unit 134 configured to select types of traffic participant and road environment recognized by the peripheral situation recognition unit or a word or a phrase indicating a positional relationship between the host vehicle M and the traffic participant and the road environment; and the text generation unit 138 configured to generate text indicating the peripheral situation recognized by the peripheral situation recognition unit 132, so that it is possible to further improve the accuracy of prediction by predicting a change in the peripheral situation on the basis of text indicating a result of recognizing the peripheral situation of the host vehicle.

[Hardware Configuration]

Figure 17:
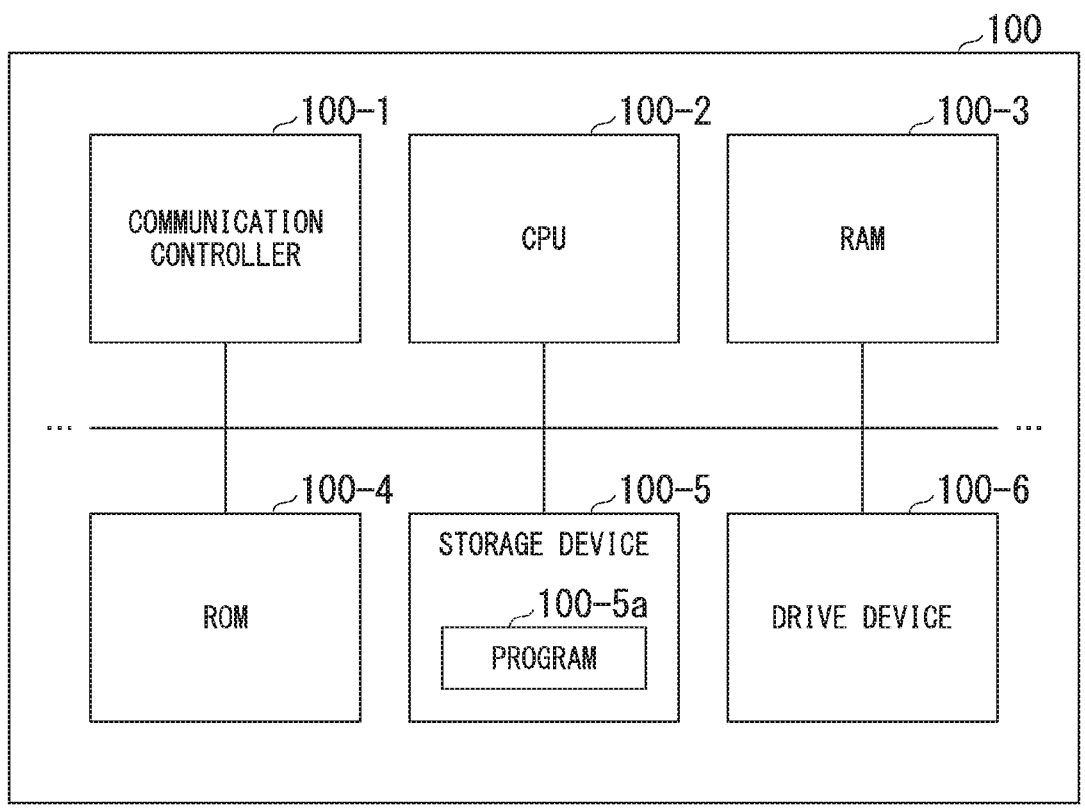
FIG. 17 is a diagram showing an example of a hardware configuration of an automated driving control device according to an embodiment.

FIG. 17 is a diagram showing an example of a hardware configuration of the automated driving control device 100 of an embodiment. As shown, the automated driving control device 100 has a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6, and the like are mutually connected by an internal bus or a dedicated communication line. The communication controller 100-1 communicates with components other than the automated driving control device 100. A program 100-5a executed by the CPU 100-2 is stored in the storage device 100-5. This program is loaded to the RAM 100-3 by a direct memory access (DMA) controller (not shown) or the like and executed by the CPU 100-2. Thereby, the recognition unit 130 and the action plan generation unit 140 are implemented.

The above-described embodiment can be represented as follows.

A vehicle control device including:

a storage device configured to store a program; and a hardware processor, wherein the hardware processor executes the program stored in the storage device to:

recognize a peripheral situation of a vehicle, and execute driving control for controlling one or both of steering and acceleration/deceleration of the vehicle on the basis of the recognized peripheral situation, wherein the hardware processor includes an object recognition unit configured to select a word indicating the type of object recognized by the peripheral situation recognition unit and a word indicating a positional relationship between the vehicle and the object; and a text generation unit configured to generate text for describing a peripheral situation, wherein the text includes the word indicating the type of object selected by the object recognition unit and the word indicating the positional relationship between the vehicle and the object selected by the object recognition unit, wherein the driving control unit executes the driving control on the basis of the text generated by the text generation unit.

Although modes for carrying out the present invention have been described above using embodiments, the present invention is not limited to these embodiments at all and various modifications and substitution can be made without departing from the spirit and scope of the present invention.

What is claimed is:

1. A recognition processing device comprising:

a peripheral situation recognition unit configured to recognize a type of object around a vehicle and a positional relationship with the vehicle;

an object recognition unit configured to select a word indicating the type of object recognized by the peripheral situation recognition unit and a word indicating a positional relationship between the vehicle and the object; and a text generation unit configured to, by using priority that is set based on the object having a large influence on the vehicle among objects or based on a positional relationship between the objects, generate text for describing a peripheral situation recognized by the peripheral situation recognition unit, wherein the text includes the word indicating the type of object selected by the object recognition unit and the word indicating the positional relationship between the vehicle and the object selected by the object recognition unit and is generated in accordance with a prescribed grammar.

2. The recognition processing device according to claim 1, wherein the text generation unit sets priority by identifying the object having a large influence on the vehicle among objects and preferentially includes the word for describing the peripheral situation including the object with high priority in the text.

3. The recognition processing device according to claim 1, wherein the text generation unit sets priority by identifying the object having a large influence on the vehicle among objects and causes the text for describing the peripheral situation including the object with high priority to be preferentially disposed in a higher-order paragraph among paragraphs constituting the text.

4. The recognition processing device according to claim 1, wherein the text generation unit sets priority by identifying a positional relationship between a plurality of objects having a large influence on the vehicle among objects and preferentially includes the word for describing the peripheral situation including a positional relationship between the objects having high priority in the text.

5. A vehicle control device comprising:
the recognition processing device of claim 1;
a text analysis unit configured to predict a change in a peripheral situation on the basis of the text; and
a driving control unit configured to execute driving control for controlling one or both of steering and acceleration/deceleration of the vehicle on the basis of the text generated by the text generation unit of the recognition processing device.

6. The vehicle control device according to claim 5, wherein the text analysis unit analyzes whether the text is text indicating the peripheral situation that is able to occur due to an attribute of the object, outputs the text generated by the text generation unit when it is analyzed that the text is the text indicating the peripheral situation that is able to occur due to the attribute of the object, and discards the text generated by the text generation unit when it is analyzed that the text is not the text indicating the peripheral situation that is able to occur due to the attribute of the object.

7. A recognition control method comprising:
recognizing, by a computer, a type of object around a vehicle and a positional relationship with the vehicle;
selecting, by the computer, a word indicating the recognized type of object and a word indicating a positional relationship between the vehicle and the object; and
generating, by the computer and by using priority that is set based on the object having a lame influence on the vehicle among objects or based on a positional relationship between the objects, text for describing a recognized peripheral situation, wherein the text includes the selected word indicating the type of object and the word indicating the positional relationship between the vehicle and the object and is generated in accordance with a prescribed grammar.

8. A computer-readable non-transitory storage medium storing a program for causing a computer to:
recognize a type of object around a vehicle and a positional relationship with the vehicle;
select a word indicating the recognized type of object and a word indicating a positional relationship between the vehicle and the object; and
generate, by using priority that is set based on the object having a large influence on the vehicle among objects or based on a positional relationship between the objects, text for describing a recognized peripheral situation, wherein the text includes the selected word indicating the type of object and the word indicating the positional relationship between the vehicle and the object and is generated in accordance with a prescribed grammar.

9. A recognition processing device comprising:
a peripheral situation recognition unit configured to recognize a type of object around a vehicle and a positional relationship with the vehicle;
an object recognition unit configured to select a word indicating the type of object recognized by the peripheral situation recognition unit and a word indicating a positional relationship between the vehicle and the object; and
a text generation unit configured to generate text for describing a peripheral situation recognized by the peripheral situation recognition unit, wherein the text includes the word indicating the type of object selected by the object recognition unit and the word indicating the positional relationship between the vehicle and the object selected by the object recognition unit and is generated in accordance with a prescribed grammar,
wherein the text generation unit sets priority by identifying the object having a large influence on the vehicle among objects and preferentially includes the word for describing the peripheral situation including the object with high priority in the text.

10. A vehicle control device comprising:
a recognition processing device including:
a peripheral situation recognition unit configured to recognize a type of object around a vehicle and a positional relationship with the vehicle;
an object recognition unit configured to select a word indicating the type of object recognized by the peripheral situation recognition unit and a word indicating a positional relationship between the vehicle and the object; and
a text generation unit configured to generate text for describing a peripheral situation recognized by the peripheral situation recognition unit, wherein the text includes the word indicating the type of object selected by the object recognition unit and the word indicating the positional relationship between the vehicle and the object selected by the object recognition unit and is generated in accordance with a prescribed grammar;
a text analysis unit configured to predict a change in a peripheral situation on the basis of the text; and
a driving control unit configured to execute driving control for controlling one or both of steering and acceleration/deceleration of the vehicle on the basis of the text generated by the text generation unit of the recognition processing device.

* * * * *